(12) United States Patent
Higashi et al.

(10) Patent No.: US 6,968,262 B2
(45) Date of Patent: Nov. 22, 2005

(54) STEERING ANGLE CORRECTION DEVICE

(75) Inventors: Masayasu Higashi, Tondabayashi (JP); Ryouhei Hayama, Nabari (JP)

(73) Assignee: Koyo Seiko Co., Ltd., Osaka (JP)

( * ) Notice: Subject to any disclaimer, the term of this patent is extended or adjusted under 35 U.S.C. 154(b) by 167 days.

(21) Appl. No.: 10/712,497

(22) Filed: Nov. 13, 2003

(65) Prior Publication Data
US 2004/0094351 A1 May 20, 2004

(30) Foreign Application Priority Data
Nov. 19, 2002 (JP) .............................. 2002-335039

(51) Int. Cl.$^7$ .......................... G06F 19/00; B62D 5/00
(52) U.S. Cl. .................... 701/41; 180/6.2; 180/6.6; 180/401; 180/410; 180/411; 280/5.51; 280/211; 477/1
(58) Field of Search .............................. 701/41, 42, 43; 180/6.2, 6.6, 401, 410, 411, 404, 408, 409, 180/422, 444, 445, 447, 425; 280/5.51, 211, 280/91, 425; 477/1

(56) References Cited

U.S. PATENT DOCUMENTS

| | | | | |
|---|---|---|---|---|
| 5,184,298 A | * | 2/1993 | Imaseki et al. | 701/41 |
| 5,508,921 A | * | 4/1996 | Chikuma et al. | 701/41 |
| 6,345,218 B1 | * | 2/2002 | Yamanaka et al. | 701/41 |
| 6,546,323 B2 | * | 4/2003 | Deguchi et al. | 701/41 |

FOREIGN PATENT DOCUMENTS

| | | |
|---|---|---|
| DE | 40 09 007 | 9/1990 |
| EP | 0 381 963 | 8/1990 |
| JP | 2001-4313 | 1/2001 |

* cited by examiner

*Primary Examiner*—Jack Keith
*Assistant Examiner*—Ronnie Mancho
(74) *Attorney, Agent, or Firm*—Jordan and Hamburg LLP

(57) ABSTRACT

Steering angle is determined by the combined use of a potentiometer and a rotary encoder, and the correction of the error in the determination of the steering angle based on the time-dependent change of the potentiometer.

4 Claims, 4 Drawing Sheets

STEERING ANGLE CORRECTION DEVICE

FIELD OF THE INVENTION

The present invention relates to a steering angle correction device which is used to correct the detected error in the steering angle in a vehicle steering apparatus, in which the action of an actuator controlled in accordance with the detected value of the steering angle from the center point position of a steering member such as a steering wheel is transmitted to the vehicle wheels so that the vehicle steering angle varies.

DESCRIPTION OF THE RELATED ART

Conventionally, it is proposed to use a means for determining the center point position of a steering member and a rotary encoder which outputs a number of pulse signals corresponding to the determined steering angle from this center point position in order to detect the steering angle from the center point position of the steering member (Japanese Patent Application Laid-Open No. 2001-4313).

In the conventional means for determining the center point position of the steering member, reflective type roadway boundary markers disposed along the roadway are detected by a laser beam emitted from the vehicle, a judgement as to whether or not the vehicle is advancing straight forward is made on the basis of these detection results, and in cases where the vehicle is advancing straight forward, the steering member is judged to be in the center point position. Accordingly, the construction of such means is complicated, and the cost is increased. Furthermore, in vehicles using a so-called steer-by-wire system in which the steering member and the vehicle wheels are not mechanically connected, and in vehicles in which the steering wheel and the vehicle wheels are mechanically connected so that the ratio of the steering angle of the steering wheel to the vehicle steering angle can be altered in accordance with the vehicle speed or the like, the steering member is not always positioned in the center point position even if the vehicle is advancing straight forward. Accordingly, it is conceivable that the steering angle from the center point position of the steering member might be detected using an absolute position detection sensor such as a potentiometer which outputs an analog signal with a value corresponding to the absolute position of the steering member. However, sensors which output an analog signal such as potentiometers have a large output error caused by a time-dependent change compared to sensors which output digital signals such as rotary encoders, so that the detection precision of such sensors drops in the case of long-term use. In particular, resistance elements of contact type potentiometers become worn as a result of contact with brushes, so that the output error caused by the time-dependent change is large.

SUMMARY OF THE INVENTION

Accordingly, the determination of the steering angle by the combined use of a potentiometer and a rotary encoder, and the correction of the error in the determination of the steering angle based on the time-dependent change of the potentiometer, have been proposed by the present applicant. Specifically, the absolute position of the steering member at the time of initiation of control action of the steering actuator is determined from the output of the potentiometer, and the steering angle from the center point position of the steering member is subsequently determined from the number of pulses emitted by the rotary encoder in accordance with the steering angle of the steering member. Furthermore, the rotary encoder is disposed so as to output a Z-phase pulse signal when the steering member is positioned in the center point position. Consequently, if there is no error in the output of the potentiometer, the steering angle determined from the output of the potentiometer and the number of pulses generated by the rotary encoder is zero at the point in time at which a Z-phase pulse signal is output. Accordingly, the steering angle from the center point position of the steering member can be accurately determined, by taking the steering angle from the center point position determined at the point in time at which a Z-phase pulse signal is output as the error in the steering angle and then correcting the steering angle by an amount corresponding to this error.

However, in cases where the output error of the potentiometer arising from the time-dependent change is large, the amount of correction of the steering angle at the point in time at which the above-mentioned Z-phase pulse signal is output becomes large. Accordingly, in cases where the control of the steering actuator is ended by stopping the vehicle in a state in which the steering member is positioned in a position other than the center point position, the detection error of the steering angle is large because no Z-phase pulse signal is output at the point in time at which the control action is initiated for the next starting of the vehicle. As a result, the steering actuator cannot be controlled in accordance with an accurate steering angle. Furthermore, since the steering angle is corrected at the point in time at which the Z-phase pulse signal is output as a result of the steering member being positioned in the center point position, the steering angle abruptly varies during the control of the steering actuator so that the behavior of the vehicle may become unstable.

It is an object of the present invention to provide a steering angle correction device that can solve the above-mentioned problems.

The present invention is a steering angle correction device in a vehicle steering apparatus in which the action of a steering actuator controlled in accordance with the steering angle from the center point position of a steering member is transmitted to the vehicle wheels so that the vehicle steering angle varies, the steering angle correction device comprising: an absolute position detection sensor which outputs an analog signal with a value corresponding to the absolute position of the steering member; a position sensor which outputs a steering angle detection signal corresponding to the variation in the steering angle of the steering member, and which outputs a position specifying signal when the steering member is in a predetermined specified position; a steering direction determining part which determines the steering direction of the steering member; a steering initiation position determining part which determines the steering initiation position, which is the absolute position of the steering member corresponding to the output value of the absolute position detection sensor at the time of initiation of control action, on the basis of a stored correspondence relationship between the absolute position of the steering member and the output value of the absolute position detection sensor; a reference position determining part which determines the reference position by correcting the steering initiation position by an amount corresponding to the reference error determined and stored in the preceding control action; a current position determining part which determines the current position of the steering member from the reference position, the steering angle detection signal, the steering direction of the steering member, and a stored correspondence relationship between the steering angle detection signal and the variation in the steering angle of the steering member; an error determining part which determines the deviation between the current position of the steering member at the time when the position specifying signal is generated and the generation position of the position specifying signal as the error in the current control action; a corrected position determining part which determines the corrected position of the steering member by correcting the current position by an amount corresponding to the error in the current control action; and a reference error for the next control action determining and storing part which determines and stores the reference error for the next control action by adding the error in the current control action to the cumulative value of the errors in the control actions up to the preceding control action; wherein the steering actuator is controlled in accordance with the corrected position of the steering member as the steering angle from the center point position of the steering member.

In the present invention, even if the output value of the absolute position detection sensor fluctuates as a result of time-dependent change, the error in the steering angle caused by these fluctuations in the output value can be corrected. Furthermore, the timing of correction of this error is divided into the initiation of control action and the time at which the position specifying signal of the position sensor is generated, in which the error corresponding to the reference error in the preceding control action is corrected at the time when the control is initiated; accordingly, the amount of error correction at the time when the position specifying signal is generated can be reduced to a small amount of correction. As a result, abrupt variations in the vehicle steering angle caused by error correction during the control action can be reduced to small variations.

In the steering angle correction device of the present invention, it is desirable to use the reference error determined during the preceding control action as the value corresponding to the cumulative value of the errors in the control actions up to the preceding control action. Alternatively, it is desirable to provide a reference error storing part which stores the reference errors in a plurality of immediately preceding control actions, and an arithmetical mean value determining part which determines the arithmetical mean value of the stored reference errors in the plurality of control actions, and to use this arithmetical mean value as the value corresponding to the cumulative value of the errors in the control actions up to the preceding control action. In this way, fluctuations in the reference error can be evened out.

In the steering angle correction device of the present invention, it is desirable that an output value storing part which stores the output value of the absolute position detection sensor at the time of the initiation of control action is provided, that the reference error for the next control action is stored with related to the output value of the absolute position detection sensor at the time of initiation of control action, and that the reference position is determined by correcting the steering initiation position by an amount corresponding to the reference error stored with related to the output value of the absolute position detection sensor at the time of initiation of control action. As a result, in cases where the output error of the absolute position detection sensor is not uniform and differs according to the steering angle, the error in the steering angle can be corrected in accordance with the non-uniformity of the output error, so that the precision of correction can be improved.

According to the steering angle correction device of the present invention, abrupt variations in the steering angle caused by error correction during the control action can be reduced to slight variations, and the error correction can be performed with higher precision, so that the behavior of the vehicle can be prevented from becoming unstable.

DESCRIPTION OF THE PREFERRED EMBODIMENTS

Figure 1:
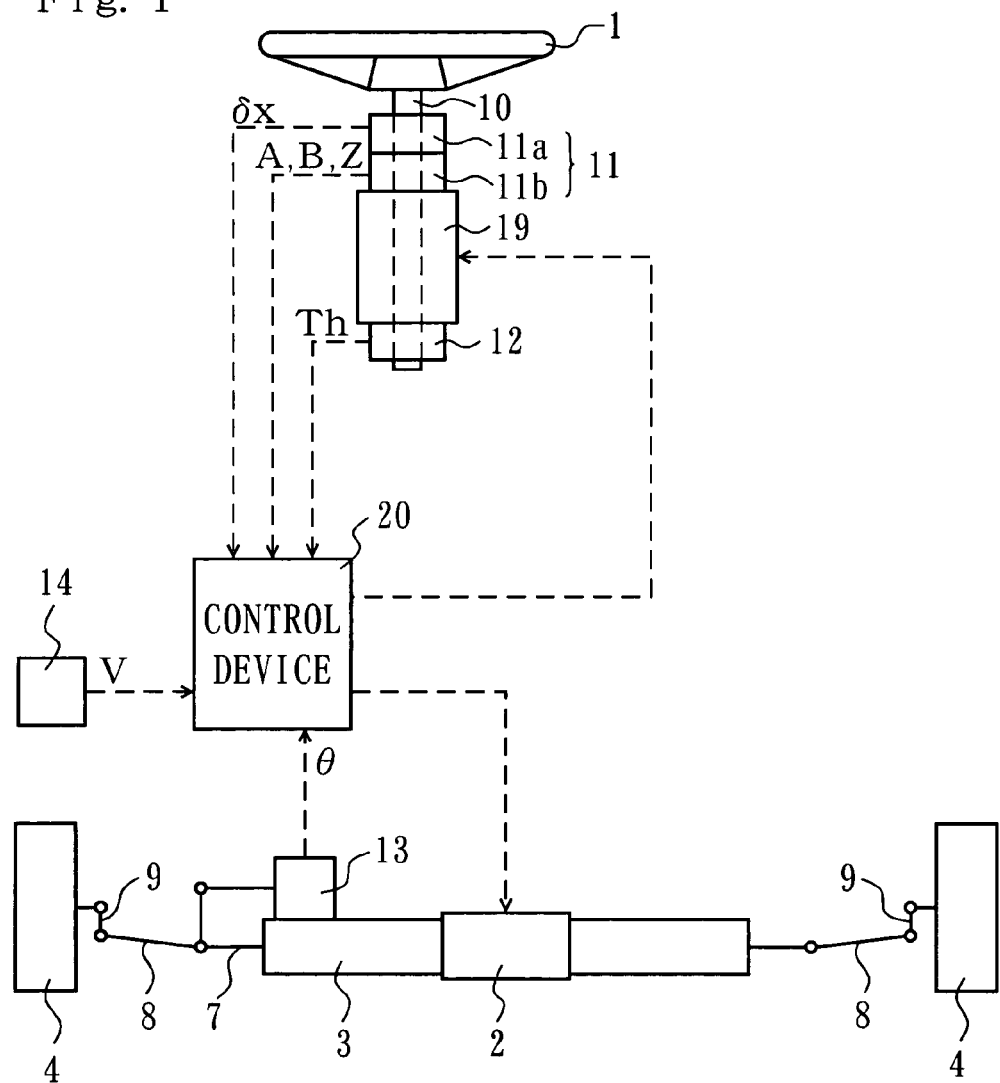
FIG. 1 is a structural explanatory diagram of a vehicle steering apparatus in an embodiment of the present invention.

The vehicle steering apparatus shown in FIG. 1 comprises a steering member 1 as modeled by a steering wheel, a steering actuator 2, and steering gear 3 which transmits the action of the steering actuator 2 to the vehicle wheels 4 so that the vehicle steering angle varies without any mechanical linkage of the steering member 1 to the vehicle wheels 4.

The steering member 1 is connected to an input side rotating shaft 10 which is supported by the vehicle body so that this rotating shaft 10 is free to rotate, thus causing the steering member 1 to rotate together with the rotating shaft 10. The output shaft of a resistance force generating actuator 19 is formed as an integral part of the input side rotating shaft 10. The resistance force generating actuator 19 can generate a torque that acts on the steering member 1. The resistance force generating actuator 19 can be constructed from an electric motor such as a brushless motor or the like.

The steering actuator 2 can be constructed from an electric motor such as a brushless motor or the like. The steering gear 3 has a motion converting mechanism that converts the rotational motion of the output shaft of the steering actuator 2 into the rectilinear motion of a steering rod 7. The action of the steering rod 7 is transmitted to the vehicle wheels 4 via tie rods 8 and knuckle arms 9, so that the vehicle steering angle varies. A known gear can be used as the steering gear 3; there are no restrictions on the construction of the steering gear as long as it is capable of transmitting the action of the steering actuator 2 to the vehicle wheels 4 so that the vehicle steering angle varies. For example, it can be constructed by forming ball screw shaft that is screw-engaged with ball nut driven by the steering actuator 2 as an integral part of the steering rod 7. The wheel alignment is set so that the vehicle wheels 4 can be returned to the straight forward position by a self-aligning torque in a state in which the steering actuator 2 is not being driven.

Figure 2:
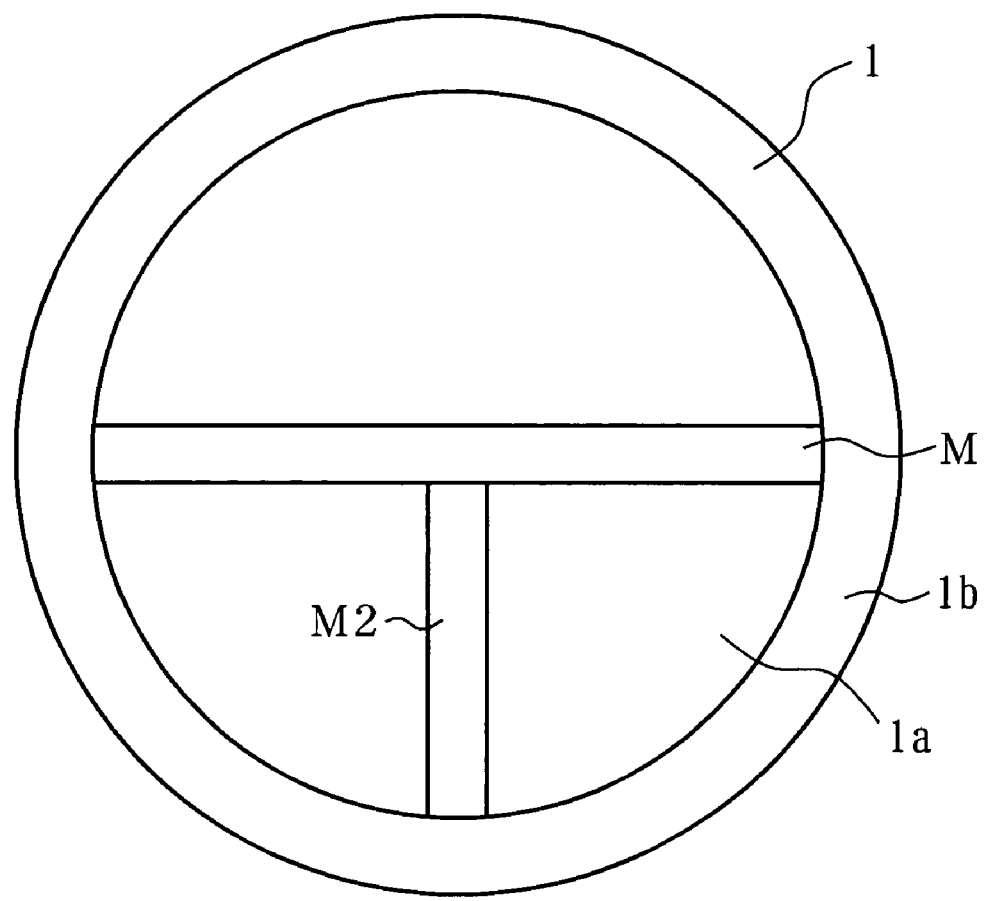
FIG. 2 is a diagram which shows the steering member in the vehicle steering apparatus in the embodiment of the present invention.

As is shown in FIG. 2, a marker M is attached to the steering member 1. The steering member 1 of the present embodiment has a disk part 1a, and an annular grip 1b which surrounds the circumference of this disk part 1a. The marker M is formed substantially in a T shape, and has an indicator part M2 which is disposed along the radius of the disk part 1a. When the direction of length of this indicator part M2 is oriented along the forward-rearward direction of the vehicle, the steering member 1 is positioned in the center point position.

An angle detection device 11 is provided which detects the steering angle θh corresponding to the rotational angle of the input side rotating shaft 10 from the center point position as the steering angle from the center point position of the steering member 1. The angle detection device 11 has a potentiometer (absolute position detection sensor) 11a and a rotary encoder (position sensor) 11b. The potentiometer 11a outputs an analog signal with a value that corresponds to the absolute position of the steering member 1; for example, this potentiometer outputs an analog signal as a result of the position of contact between a variable resistance element and a brush varying due to the rotation of the steering member 1. The rotary encoder 11b generates an A-phase pulse signal whose number of pulses corresponding to the variation in the steering angle θh, and a B-phase pulse signal whose phase is shifted with respect to the A-phase pulse signal (e.g., whose phase is shifted by ¼ period); furthermore, the rotary encoder 11b also generates a Z-phase pulse signal (position specifying signal) with each rotation of 360 degrees. The rotary encoder 11b is disposed so as to generate the Z-phase pulse signal when the steering member 1 is in a predetermined specified position (the center point position in the present embodiment). The potentiometer 11a and rotary encoder 11b are connected to a control device 20 constructed from a computer.

The control device 20 stores a correspondence relationship between the output value δx of the potentiometer 11a and the absolute position of the steering member 1 expressed by the steering angle θh, and determines the steering initiation position θh(δx) which is the absolute position of the steering member 1 corresponding to the output value δx of the potentiometer 11a at the time of initiation of control action on the basis of this relationship. Furthermore, the control device 20 judges the steering direction of the steering member 1 according to whether the phase of the B-phase pulse signal is advanced or retarded with respect to the phase of the A-phase pulse signal. Moreover, the control device 20 stores the reference error Δθh determined in the preceding control action, and determines the reference position [θh(δx)−Δθh] by correcting the steering initiation position θh(δx) by an amount corresponding to the reference error Δθh. Furthermore, the control device 20 stores a correspondence relationship between the number of pulses generated by the rotary encoder 11b and the variation in the steering angle θh, and determines the current position θhx of the steering member 1 from the determined reference position [θh(δx)−Δθh], the number of pulses of the A-phase pulse signal generated by the steering of the steering member 1, and the steering direction of the steering member 1. The deviation between the current position θhx of the steering member 1 at the time when the Z-phase pulse signal is generated and the generation position (the center point position in the present embodiment) of the Z-phase pulse signal is taken as the error ϵ in the current control action. Accordingly, the corrected position (θhx−ϵ) of the steering member 1 is determined by correcting the current position θhx by an amount corresponding to the error ϵ in the current control action. When the steering actuator 2 is controlled by the control device 20 in accordance with the steering angle θh from the center point position of the steering member 1, the corrected position (θhx−ϵ) is used as the steering angle θh from the center point position. As a result, even if the output value δx of the potentiometer 11a fluctuates as a result of time-dependent change caused by wear of the internal variable resistance element or the like, the error in the steering angle θh caused by these fluctuations in the output value δx can be corrected. Furthermore, the control device 20 determines and stores the reference error Δθh for the next control action by adding the error ϵ in the current control action to a value that corresponds to the cumulative value of the errors in the control actions up to the preceding control action. In the present embodiment, the reference error Δθh determined and stored in the preceding control action is used as this value that corresponds to the cumulative value of the errors in the control actions up to the preceding control action. The initial value of this reference error Δθh is set at zero.

A torque sensor 12 which detects the torque that is transmitted by the input side rotating shaft 10 as the steering torque Th of the steering member 1, a vehicle steering angle sensor 13 which detects the vehicle steering angle θ as the amount of steering of the vehicle wheels 4 from the amount of movement of the steering rod 7, and a speed sensor 14 which detects the vehicle speed V are connected to the control device 20 constructed from a computer.

Figure 3:
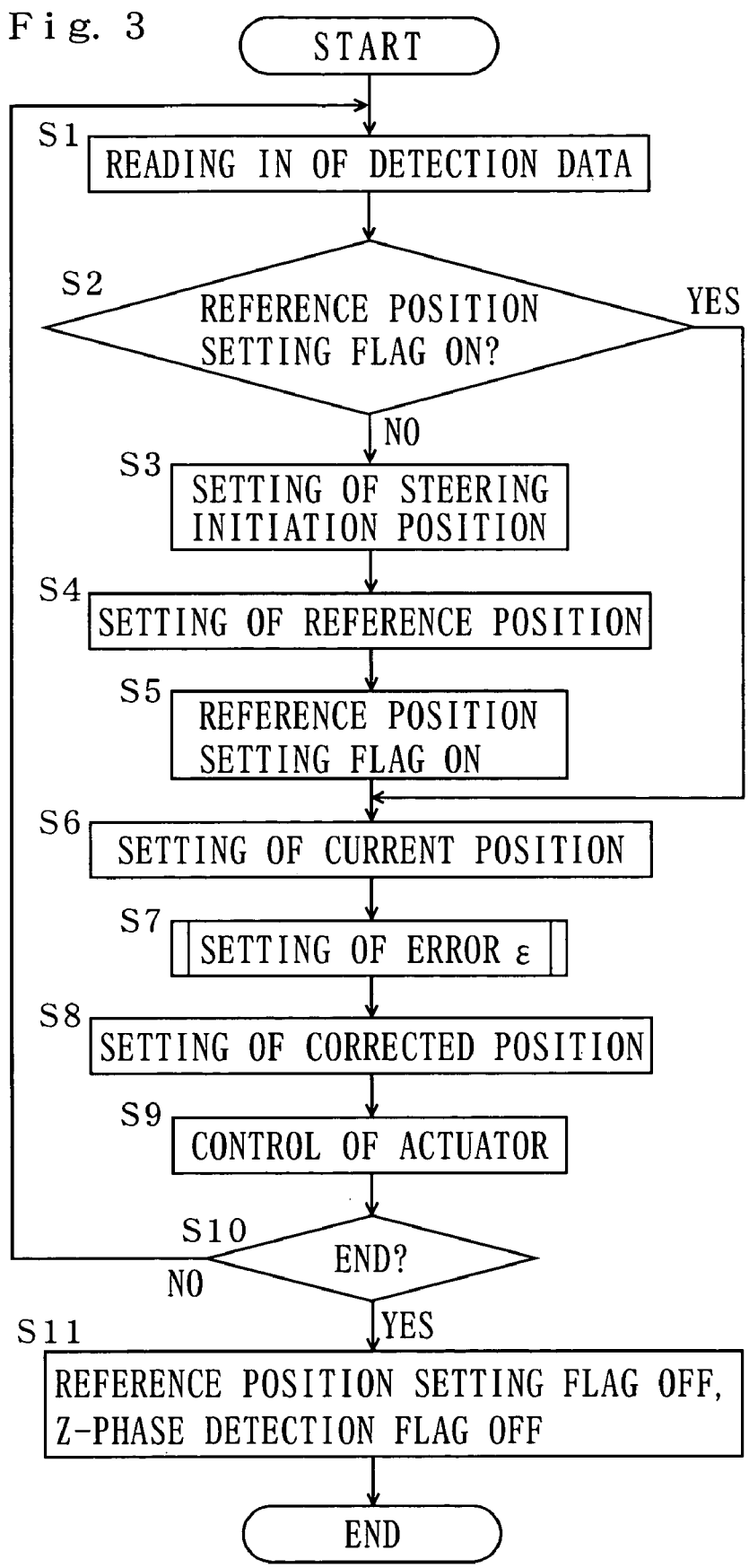
FIG. 3 is a flow chart which shows the control procedure of the resistance force generating actuator and steering actuator in the vehicle steering apparatus in the embodiment of the present invention.

The control procedure of the control device 20 is described with reference to the flow chart shown in FIG. 3. First, when control action is initiated by supplying power to the control device 20 as a result of, for example, the ignition switch being switched on, the detection data of the respective sensors is read in (step S1). Next, a judgement is made as to whether or not the reference position setting flag is on (step S2). If this flag is not on, the steering initiation position θh(δx) of the steering member 1 corresponding to the output value δx of the potentiometer 11a detected at the time of initiation of control action is determined (step S3), the reference position [θh(δx)−Δθh] is determined by correcting the steering initiation position θh(δx) by an amount corresponding to the stored reference error Δθh (step S4), and the reference position setting flag is switched on (step S5). Next, the current position θhx of the steering member 1 is determined from the determined reference position [θh(δx)−Δθh], the number of pulses generated by the rotary encoder 11b as a result of the steering of the steering member 1, and the steering direction of the steering member 1 (step S6). If the reference position setting flag is on in step S2, the current position θhx of the steering member 1 is determined in step S6. Next, the error ϵ of the current position θhx of the steering member 1 is set (step S7).

Figure 4:
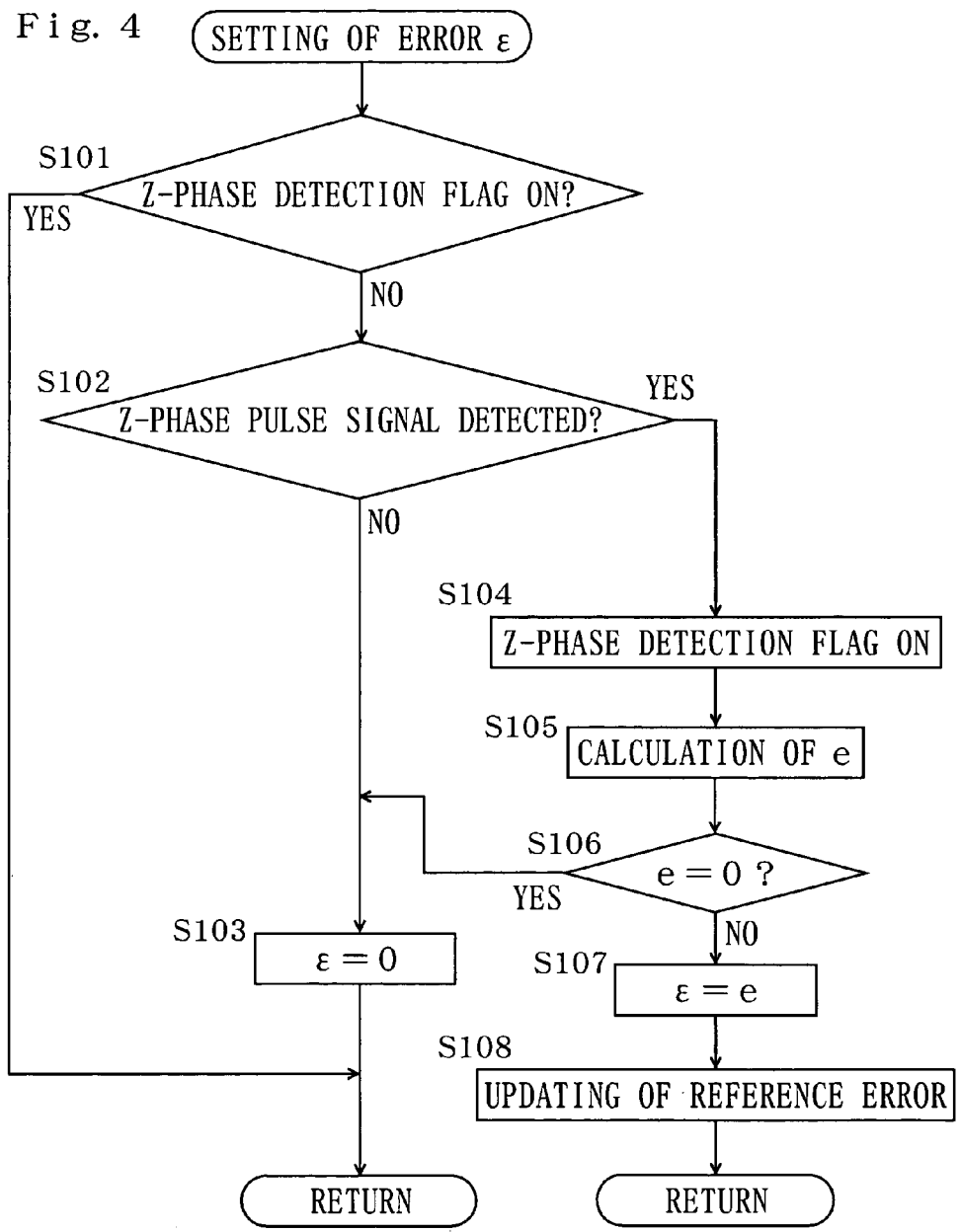
FIG. 4 is a flow chart which shows the setting procedure for the error of the current position of the steering member in the vehicle steering apparatus in the embodiment of the present invention.

The flow chart shown in FIG. 4 shows the setting procedure of the error ϵ of the current position θhx of the steering member 1. First, a judgement is made as to whether or not the Z-phase detection flag is on (step S101). If this flag is not on, a judgement is made as to whether or not a Z-phase pulse signal has been detected (step S102). If such a signal has not been detected, the error ϵ is set at zero, and the processing is returned (step S103). If a Z-phase pulse signal has been detected, the Z-phase detection flag is switched on (step S104), and the deviation e between the current position θhx of the steering member 1 at the time when the Z-phase pulse signal is generated and the generation position (the center point position in the present embodiment) of the Z-phase pulse signal is determined (step S105). Next, a judgement is made as to whether or not the determined deviation e is zero (step S106), and if this deviation is zero, the error ϵ is set at zero, and the processing is returned. If the determined deviation e is not zero, the determined deviation e is set as the error ϵ in the current control action (step S107), and a value obtained by adding this set error ϵ to the stored reference error Δθh is stored as the reference error Δθh for the next control action. In this way, the reference error Δθh is updated (step S108). If the Z-phase detection flag is on in step S101, the processing is returned.

After the error ε in the current control action has been set, the corrected position (θhx−ε) of the steering member 1 is determined by correcting the current position θhx by an amount corresponding to this error ε (step S8). Next, the steering actuator 2 and the resistance force generating actuator 19 are controlled in accordance with the corrected position (θhx−ε) of the steering member 1 (step S9). For example, the target vehicle steering angle θ* corresponding to the corrected position (θhx−ε) of the steering member 1 and the detected vehicle speed V is determined from a stored relationship, and the steering actuator 2 is feedback-controlled so that the deviation between the target vehicle steering angle θ* and the detected vehicle steering angle θ is reduced, so that the detected vehicle steering angle θ is zero when the steering member 1 is positioned in the center point position. For example, this stored relationship is predetermined so that the target vehicle steering angle increases as the steering angle increases, and as the vehicle speed increases. Furthermore, the target operating torque Th* corresponding to the corrected position (θhx−ε) of the steering member 1 and the detected vehicle speed V is determined from a stored relationship, and the resistance force generating actuator 19 is feedback-controlled so that the deviation between the target operating torque Th* and the detected operating torque Th is reduced. This stored relationship is predetermined so that, for example, the target operating torque decreases as the steering angle increases, and as the vehicle speed decreases.

Next, a judgement is made as to whether or not to end control action according to, for example, whether or not the ignition switch of the vehicle is on (step S10). In cases where control action is not to be ended, the processing returns to step S1. In cases where control action is to be ended, the reference position setting flag and Z-phase detection flag are switched off (step S11), and the supply of power to the control device 20 is cut off, so that control action is ended.

In the above-mentioned construction, even if the output value δx of the potentiometer 11a should fluctuate as a result of a time-dependent change such as wear of the internal variable resistance or the like, the error in the steering angle θh caused by such fluctuations in the output value δx can be corrected. Furthermore, since the correction of this error is divided into the initiation of control action and the time when the Z-phase pulse signal is generated by the rotary encoder 11b, in which the error corresponding to the reference error in the preceding control action is corrected at the initiation of control action, so that the amount of the correction of the error at the time of generation of the Z-phase pulse signal is slight. As a result, abrupt variations in the steering angle θh caused by error correction during control action can be reduced to slight variations, so that the behavior of the vehicle can be prevented from becoming unstable.

The present invention is not limited to the above-mentioned embodiment.

For example, in step S108 of the flow chart shown in FIG. 4 for the above-mentioned embodiment, the reference error Δθh is updated by storing a value obtained by adding the error ε in the current control action to the stored reference error Δθh as the reference error Δθh for the next control action. Instead of this, it is possible to store the reference errors Δθh in a plurality of immediately preceding control actions (e.g., 10 control actions) in the control device 20.

Then, in step S108, a value obtained by adding the error ε in the current control action to the arithmetical mean value of the stored reference errors Δθh in the above-mentioned plurality of immediately preceding control actions is stored as the reference error Δθh for the next control action. As a result, fluctuations in the reference error Δθh can be evened out by using the arithmetical mean value as a value corresponding to the cumulative value of the errors in the control actions up to the preceding control action. The set initial value (e.g., zero) can be used as the reference error Δθh until the number of immediately preceding control actions reaches the set number of control actions.

Furthermore, in the above-mentioned embodiment, a judgement as to whether or not the determined deviation e is zero is made in step S106 of the flow chart shown in FIG. 4. Instead of this, a judgement regarding the ending of control action is made in step S10 of the flow chart shown in FIG. 3; then, after the last output value δx' of the potentiometer 11a that has been detected is stored, control action is ended. Furthermore, in step S106, a judgement is made as to whether or not the deviation e' between the output value δx of the potentiometer detected at the time of initiation of control action and the last output value δx' stored in the preceding control action is zero, and if this deviation e' is not zero, the deviation e' is set as the error ε in step S107. On the other hand, if this deviation e' is zero, then the error ε is set as zero in step S103.

Furthermore, it is also possible to store the output value of the potentiometer 11a at the time of initiation of control action, the reference error for the next control action is stored with related to the output value of the potentiometer 11a at the time of initiation of control action, and in the next control action, the reference position [θh(δx)−Δθh] is determined by correcting the steering initiation position θh(δx) by an amount corresponding to the reference error Δθh stored with related to the output value of the potentiometer 11a stored at the time of initiation of control action. Specifically, in step S4 of the flow chart shown in FIG. 3, the reference position [θh(δx)−Δθh] is determined by correcting the steering initiation position θh(δx) by an amount corresponding to the reference error Δθh stored with related to the output value δx of the potentiometer 11a detected at the time of initiation of control action. Further, in step S108 in FIG. 4, the value determined by adding the set error ε to the reference error Δθh stored with related to the output value δx of the potentiometer 11a detected at the time of initiation of control action is stored with related to the output value δx as the reference error Δθh for the next control action. As a result, the error of the steering angle θh can be corrected in accordance with the non-uniformity of the output error of the potentiometer 11a. Specifically, since the output frequency of the potentiometer 11a increases in the vicinity of the center point position of the steering angle θh, wear of the internal variable resistance of the potentiometer 11a and the like increase in the vicinity of the center point position of the steering angle θh. Accordingly, the output error of the potentiometer 11a is not uniform, but differs according to the steering angle θh. The precision of correction can be improved by correcting the error in the steering angle θh in accordance with such non-uniformity of the output error.

Furthermore, the present invention can also be applied to a steering apparatus in which the steering wheel as the steering member is mechanically connected to the vehicle wheels, and in which the ratio of the steering angle of the steering wheel to the amount of steering of the vehicle wheels can be varied or cannot be varied.

Furthermore, instead of judging the steering direction according to whether the phase of the B-phase pulse signal is advanced or retarded with respect to the phase of the A-phase pulse signal, it is possible to judge this direction from the output value of the potentiometer 11a, or the detection value of a torque sensor that is separately installed in order to detect the steering torque. Moreover, it is also possible to output the Z-phase pulse signal when the steering member 1 is positioned in a position other than the center point position. Moreover, a resolver can also be used as the position sensor.

What is claimed is:

1. A steering angle correction device in a vehicle steering apparatus in which the action of a steering actuator controlled in accordance with the steering angle from the center point position of a steering member is transmitted to the vehicle wheels so that the vehicle steering angle varies, said steering angle correction device comprising:

an absolute position detection sensor which outputs an analog signal with a value corresponding to the absolute position of the steering member;

a position sensor which outputs a steering angle detection signal corresponding to the variation in the steering angle of the steering member, and which outputs a position specifying signal when the steering member is in a predetermined specified position;

a steering direction determining part which determines the steering direction of the steering member;

a steering initiation position determining part which determines the steering initiation position, which is the absolute position of the steering member corresponding to the output value of the absolute position detection sensor at the time of initiation of control action, on the basis of a stored correspondence relationship between the absolute position of the steering member and the output value of the absolute position detection sensor;

a reference position determining part which determines the reference position by correcting the steering initiation position by an amount corresponding to the reference error determined and stored in the preceding control action;

a current position determining part which determines the current position of the steering member from the reference position, the steering angle detection signal, the steering direction of the steering member, and a stored correspondence relationship between the steering angle detection signal and the variation in the steering angle of the steering member;

an error determining part which determines the deviation between the current position of the steering member at the time when the position specifying signal is generated and the generation position of the position specifying signal as the error in the current control action;

a corrected position determining part which determines the corrected position of the steering member by correcting the current position by an amount corresponding to the error in the current control action; and a reference error for the next control action determining and storing part which determines and stores the reference error for the next control action by adding the error in the current control action to the cumulative value of the errors in the control actions up to the preceding control action;

wherein the steering actuator is controlled in accordance with the corrected position of the steering member as the steering angle from the center point position of the steering member.

2. The steering angle correction device according to claim 1, wherein the reference error determined in the preceding control action is used as the value corresponding to the cumulative value of the errors in the control actions up to the preceding control action.

3. The steering angle correction device according to claim 1, further comprising:

a reference error storing part which stores the reference errors in a plurality of immediately preceding control actions; and an arithmetical mean value determining part which determines the arithmetical mean value of the stored reference errors in the plurality of control actions;

wherein said arithmetical mean value is used as the value corresponding to the cumulative value of the errors in the control actions up to the preceding control action.

4. The steering angle correction device according to claim 1, comprising:

an output value storing part which stores the output value of the absolute position detection sensor at the time of initiation of control action;

wherein the reference error for the next control action is stored with related to the output value of the absolute position detection sensor at the time of initiation of control action, and said reference position is determined by correcting the steering initiation position by an amount corresponding to the reference error stored with related to the output value of the absolute position detection sensor at the time of initiation of control action.

* * * * *